United States Patent [19]

Obayashi et al.

[11] Patent Number: 4,696,830

[45] Date of Patent: Sep. 29, 1987

[54] PROCESS FOR PREPARATION OF WATER-PROOF SHEETS

[75] Inventors: Tsutomo Obayashi, Tokyo; Shinobu Watanabe, Ora; Kazuhide Ino, Soka, all of Japan

[73] Assignee: Hiraoka & Co., Ltd., Tokyo, Japan

[21] Appl. No.: 873,764

[22] Filed: Jun. 12, 1986

Related U.S. Application Data

[63] Continuation of Ser. No. 782,355, Oct. 1, 1985.

[51] Int. Cl.[4] ............................................. C05D 3/06
[52] U.S. Cl. ........................................ 427/41; 427/40; 427/208; 427/385.5; 427/389.8; 427/393.5; 427/407.1; 427/416
[58] Field of Search ................ 427/40, 41, 208, 385.5, 427/389.8, 393.5, 407.1, 416

[56] References Cited

U.S. PATENT DOCUMENTS

3,023,126  2/1962  Underwood et al. ................ 117/76
3,669,709  6/1972  Kasugai et al. .................... 427/40 X Primary Examiner—Bernard D. Pianalto
Attorney, Agent, or Firm—Benasutti and Murray

[57] ABSTRACT

Disclosed is a process for preparing a water-proof sheet by forming a polymer coating on both the surfaces of a fibrous substrate fabric. At first, the fibrous substrate fabric is treated with a water repellant, and both the surfaces are subjected to the low temperature plasma treatment or corona discharge treatment. Then, a polymer coating is formed on both the surfaces. According to this process, the peel strength of the polymer coating is improved and the water absorbing property is reduced substantially to zero. If an inorganic fiber substrate fabric is treated according to this process, the bending resistance is highly improved in the resulting water-proof sheet.

2 Claims, 1 Drawing Figure

PROCESS FOR PREPARATION OF WATER-PROOF SHEETS

This is a continuation of application Ser. No. 782,355, filed Oct. 1, 1985.

BACKGROUND OF THE INVENTION

1. Field of the Invention

The present invention relates to a process for the preparation of water-proof sheets. More particularly, the present invention relates to a process for the preparation of water-proof sheets in which a fibrous substrate fabric constituting the water-proof sheet has no water-absorbing property.

2. Description of the Related Art

Water-proof sheets have heretofore been prepared by forming a coating of a high polymer on the surface of a fibrous substrate fabric. However, in conventional water-proof sheets having coatings formed on both the surfaces of a fibrous substrate fabric, if the coatings are ruptured or broken even slightly, water is absorbed into the fibrous substrate fabric as the intermediate layer from this rupture or breakage, or even if this rupture or breakage is not formed, water is absorbed from the cut section of the sheet. If the fiber density is high, this absorption of water is enhanced by the capillary phenomenon. Absorption of water results not only in increase of the weight of the water-proof sheet but also in reduction of the adhesion between the fibrous substrate fabric and the coating. Furthermore, absorbed water is hardly discharged from the fibrous substrate fabric and propagation of mildews is promoted, and dirty water or colored water is absorbed to degrade the appearance of the sheet.

As means for eliminating this defect, there has been adopted a method in which a fibrous substrate fabric is treated with a water repellant and a polymer coating is formed on both the surfaces. In this case, since the fibrous substrate fabric is treated with a water repellant, permeation of water is prevented, but if the water repellent effect is increased, the adhesion between the coating and the fibrous substrate fabric is reduced and also the bonding force of the coating is reduced, and the product is not preferred from the practical viewpoint. Furthermore, there is adopted a method in which an adhesive substance such as an isocyanate is incorporated into the water repellant or coating material to improve the adhesion, but even according to this method, no satisfactory results can be obtained.

SUMMARY OF THE INVENTION

Under this background, it is a primary object of the present invention to provide a process for the preparation of water-proof sheets, in which the adhesion between a fibrous substrate fabric and a polymer coating is sufficiently increased while imparting a sufficient water repellency to the fibrous substrate fabric.

In accordance with the present invention, there is provided a process for the preparation of water-proof sheets, which comprises a polymer coating on both the surfaces of a fibrous substrate fabric, wherein the fibrous substrate fabric is treated with a water repellant, both the surfaces of the fibrous substrate fabric are subjected to the low temperature plasma treatment or corona discharge treatment, and a polymer coating is formed on both the surfaces.

DESCRIPTION OF THE PREFERRED EMBODIMENTS

Figure 1:
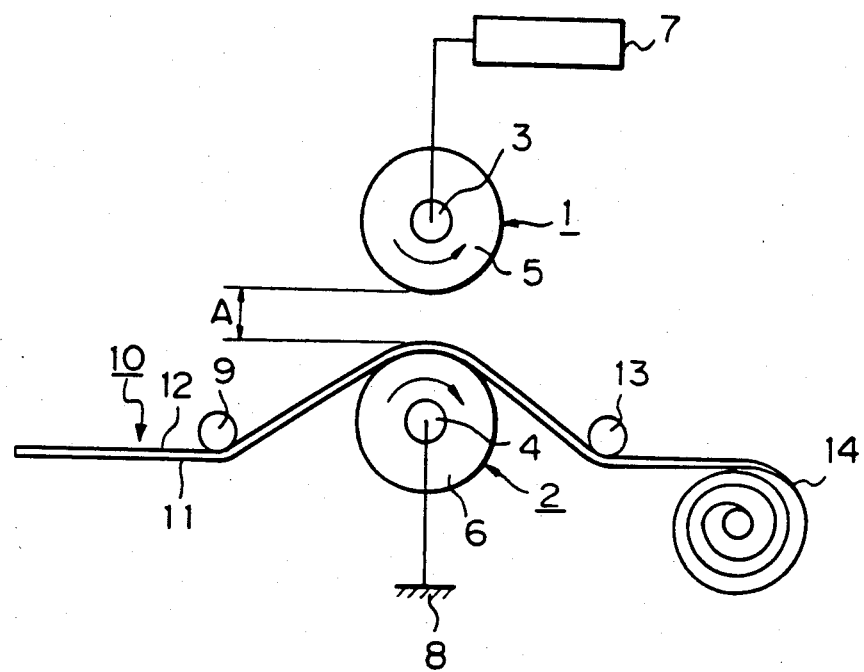
FIG. 1 is a process diagram illustrating the corona discharge treatment adopted in the process of the present invention.

A fibrous substrate fabric valuably used in the present invention is composed of at least one member selected from natural fibers such as cotton and flax, inorganic fibers such as glass fibers, carbon fibers, asbestos fibers and metal fibers, regenerated fibers such as viscose rayon and cupra, semi-synthetic fibers such as diacetate fibers and triacetate fibers, and synthetic fibers such as nylon 6, nylon 66, polyester (such as polyethylene terephthalate) fibers, aromatic polyamide fibers, acrylic fibers, polyvinyl chloride fibers, polyolefin fibers and fibers of polyvinyl alcohol rendered water-insoluble or hardly water-soluble. The fiber in the substrate fabric may be in the form of a staple spun yarn, a filamentary yarn, a split yarn, a tape yarn or the like, and the substrate fabric may be a woven fabric, a knitted fabric, a non-woven fabric or a composite fabric thereof. Polyester and glass fibers are preferred as the fiber used for the water-proof sheet of the present invention, and in view of the low elongation to the stress, it is preferred that the fiber be in the form of filaments and the filaments be formed into a plain woven fabric, through the weave or knit texture or the form thereof is not particularly critical. The fibrous substrate fabric is valuable for maintaining the mechanical strength of the obtained water-proof sheet at a high level.

In order to impart the water repellency (prevention of absorption of water) to the substrate fabric, it is necessary to treat the substrate fabric with a water repellant (some water repellant inevitably shows an oil repellent property). As typical instances of the water repellant (oil repellant), there can be mentioned waxes, aluminum soaps, zirconium salts, quaternary ammonium salts (such as stearoylmethylamidomethylene pyridinium), N-methylol fatty acid amides (such as N-methylol stearic acid amide), fluorine compounds (such as fluoroalkyl polyacrylate), silicones (such as dimethylpolysiloxane) and other known water repellants. The treatment with the water repellant can be accomplished by the impregnation method, the coating method, the spray method and the like, but the impregnation method is simple and effective.

The substrate fabric treated with the water repellant is subjected to the low temperature plasma treatment or corona discharge treatment after drying or without drying. The low temperature plasma treatment is accomplished by exposing the fibrous substrate fabric to low-temperature plasma of a gas having no plasma polymerizability under a pressure of 0.01 to 10 Torr. Plasma may be generated by applying an electric motor power of 10 to 500 W at 13.56 MHz between electrodes, and satisfactory results can be obtained by either polarized discharging or non-polarized discharging. The plasma treatment time is changed according to the applied voltage, but it is ordinarily sufficient if the plasma treatment is conducted for several seconds to scores of minuted.

Methods other than the above-mentioned method may be adopted. For example, as the discharging frequency, there can be used a low frequency, a microwave and a direct current. Furthermore, as the plasma generating system, there may be used not only glow discharge but also apark discharge and silent discharge. Furthermore, not only external electrodes but also internal electrodes, coil type electrodes, capacitor coupling electrodes and induction coupling electrodes may be used. However, in any method, care should be taken so that the surface of the material is not deteriorated by discharge heat. As the gas having no plasma polymerizability, there can be mentioned helium, neon, argon, nitrogen, nitrous oxide, nitrogen dioxide, oxygen, carbon monoxide, carbon dioxide, hydrogen, chlorine, halides such as hydrogen chloride, cyanogen bromide and tin bromide, sulfur, and sulfides such as sulfur dioxide and hydrogen sulfide. These gases may be used singly or in the form of a mixture of two or more of them.

The corona discharge treatment is accomplished by applying a high voltage between a roller supporting the substrate fabric and an electrode arranged to confront the roller, thus generating corona discharge, and treating the surface of the substrate fabric in sequence while moving the substrate fabric. For example, the corona discharge treatment may be carried out in a continuous manner by moving the substrate fabric at a predetermined speed through between a pair of roll-shaped discharge electrodes as shown in FIG. 1. Referring to FIG. 1, each of roll-shaped discharge electrodes 1 and 2 comprises one metal electrode core 3 or 4 and an electrically nonconductive resin layer 5 or 6 (for example, a rubber layer) covering the electrode core. The electrode core 3 of one roll-shaped discharge electrode is connected to a high voltage power source 7, and the electrode core 4 of the other roll-shaped discharge electrode is connected to the earth 8. The substrate fabric 10 fed through a guide roll 9 is moved at a constant speed (for example, 2 to 10 m/min) between the discharge electrodes so that one surface 11 of the fabric 10 is brought into contact with the peripheral surface of the roll-shaped electrode 2 connected to the earth. If a predetermined voltage (100 to 200 V) is applied between both the roll-shaped electrodes 1 and 2, corona discharge of 10 to 60 A is generated, and by this corona discharge, the surface 12 of the substrate fabric 10 is treated.

The spacing between the peripheral surfaces of both the electrodes is smaller than 30 mm and ordinarily 5 to 20 mm. The substrate fabric 10 which has been subjected o the corona discharge treatment is wound through a guide roll 13 to form a roll 14.

For this corona discharge treatment, the spark gap method, the vacuum tube method and the solid state method may be adopted. In order to improve the adhesiveness of the substrate fabric treated with the water repellant, it is preferred that the critical surface tension of the fabric be 35 to 60 dyn/cm. For this purpose, it is preferred that a treatment energy of 5 to 50,000 W/m²/m, especially 150 to 40,000 W/m²/m, be given to the surface of the substrate fabric. The energy quantity (voltage, current and electrode spacing) to be given to the substrate fabric is determined while taking the width of the substrate fabric and the processing speed into consideration. For example, in the case where the corona discharge treatment is conducted on the surface of a substrate fabric having a width of 2 m at a processing speed of 10 m/min, it is preferred that the output (consumed power) be about 4 to about 800 KW, through an applicable condition is not limited to this condition.

An ordinary metal electrode type corona discharge apparatus may be used for carrying out the process of the present invention. The capacities of the high voltage power source and the like of the corona discharge apparatus may be optionally determined according to the intended treatment degree.

In the present invention, in a water-proof sheet comprising a fibrous substrate fabric having a waterproof coating on both the surfaces thereof, it is intended to prevent absorption of water in the fibrous substrate fabric. Accordingly, the low temperature plasma treatment and the corona discharge treatment should be conducted on both the surfaces of the fibrous substrate fabric treated with the water repellant. In the present invention, the low temperature plasma treatment and the corona discharge treatment are performed only on the surface layer of the surface of the substrate fabric. It has been found that by such treatment, the adhesion between the fibrous substrate fabric and the coating is improved and good results are obtained.

In the present invention, the treatment with the water repellant is not carried out after the low temperature plasma treatment or corona discharge treatment for improving the adhesion, but it is important that after the treatment with the water repellant, the low temperature plasma treatment or corona discharge treatment should be carried out so as to remove hindrance of adhesion by the water repellant. The characteristic of the process of the present invention resides in this point.

A coating of a polymer is formed on both the surfaces of the so-treated substrate fabric. As the polymer, there may be used synthetic resins, synthetic rubbers and natural rubbers. As preferred examples of the synthetic resin, there can be mentioned polyvinyl chloride (PVC), polyurethane, ethylene/vinyl acetate copolymers, isotactic polypropylene, polyethylene, polyacrylonitrile, polyesters, polyamides, fluorin resins, silicone resins and other known materials. As preferred examples of the synthetic rubber, there can be mentioned styrene/butadiene rubber (SBR), chlorosulfonated polyethylene rubber, polyurethane rubber, butyl rubber, isoprene rubber, silicone rubbers, fluorine rubbers and other known materials. Polyvinyl chloride, fluorine and silicone rubbers and resins and acrylic resins are especially preferred in the present invention. A plasticizer, a colorant, a stabilizer and a flame retardant may be incorporated into the polymer, so far as attainment of the object of the present invention is not inhibited.

In order to obtain strong bonding between the fibrous substrate fabric and the polymer, it is especially preferred that an adhesive substance be interposed in the interface between the fibrous substrate fabric and the polymer. As the valuable adhesive, there can be mentioned, for example, a melamine type adhesive, a phenolic adhesive, an epoxy adhesive, a polyester adhesive, a polyethylene-imine adhesive, a polyisocyanate adhesive, a polyurethane adhesive, a polyamide adhesive, a vinyl acetate/vinyl chloride copolymer adhesive, a vinyl acetate/ethylene copolymer adhesive and a silicone adhesive, though adhesives that can be used in the present invention are not limited to those exemplified above. The adhesive substance may be incorporated into the polymer or coated on the interface.

The surface coating may be formed according to a conventional method, for example, the calender method, the extrusion method, the coating method or the dipping method.

When the treatment of the present invention is applied to a substrate fabric composed of an inorganic fiber, especially a glass fiber, in addition to the above-mentioned effects, there can be attained an effect of overcoming the defect of the glass fiber substrate fabric, that is, the low bending resistance, i.e., reduction of the strength by bending under repeated bending. Accordingly, when an inorganic fiber substrate fabric is used, the water-proof sheet obtained by the present invention is characterized in that the water-proof sheet can be used for a long time in the field where repeated bending is violent or the field where fluttering or vibration is violent.

In the water-proof sheet obtained according to the present invention, water is not contained in the fibrous substrate fabric (not absorbed in the fibrous substrate fabric) and the adhesion of the coating is very good. Therefore, the water-proof sheet according to the present invention is excellent in the water-proofness and the durability of the water-proofness. Furthermore, in the process of the present invention, the water-proof sheet can be produced very stably and the properties of the product are stable. Moreover, in the present invention, when a fabric composed of a glass fiber is used as the fibrous substrate fabric, the bending-resistant strength is highly improved, and therefore, a glass fiber fabric-containing water-proof sheet excellent in the bending resistance can be obtained. Accordingly, the process of the present invention is very valuable as the industrial process for the preparation of water-proof sheets.

The present invention will now be described in detail with reference to the following examples.

EXAMPLE 1

A polyester fiber substrate fabric (plain weave of $$\frac{1000 \, d \times 1000 \, d}{32 \text{ yarns/inch} \times 32 \text{ yarns/inch}},$$

basis weight = 300 g/m$^2$, thickness = 0.35 mm) was treated under conditions described below with Phobotex FTC (supplied by Ciba-Geigy) was used in an amount of 25% by weight based on Phobotex FTC. The water repellant was used in the form of an aqueous solution having a concentration of 9.0, 4.5, 3.6, 3.0, 2.1, 1.5, 0.9 or 0.3% by weight, and the concentration of the appied solid was 3.0, 1.5, 1.2, 1.0, 0.7, 0.5, 0.3 or 0.1% owf.

The substrate fabric was immersed in the water repellant solution having the above-mentioned concentration and squeezed by a mangle so that the wet applied amount was 100 g/m$^2$. Then, the fabric was preliminarily dried at 80° to 90° C. and baked at 150° C. for 3 minutes to effect the treatment with the water repellant (the conventional treatment).

The so-obtained fabric was subjected to the low temperature plasma treatment under a vacuum of 2 Torr at an oxygen gas flow rate of 100 ml/min and a high frequency output of 400 W (frequency of 13.56 MHz) for 2 minutes by using a low temperature plasma treatment apparatus (the treatment according to the present invention).

Both the surfaces of the obtained fibrous substrate fabric were coated with 30 g/m$^2$ of a 50% solution of 100 parts of Nipporan 3105 and 15 parts of Coronate L (each being a polyurethane type adhesive supplied by Nippon Polyurethane Kogyo) in ethyl acetate, and the fabric was dried. Then, a film (0.1 mm in thickness) of PVC having a composition described below was heat-bonded to both the surfaces.

| | |
|---|---|
| PVC | 100 parts |
| DOP (plasticizer) | 75 parts |
| Titanium dioxide | 8 parts |
| Antimony trioxide (flame retardant) | 5 parts |
| Zinc stearate (stabilizer) | 3 parts |

The peel strength of the coating and the water-absorbing property were determined according to the following methods with respect to each of the so-obtained water-proof sheets.

Measurement Methods (1) Peel Strength

The peel strength was determined according to the method 5.3.7 of JIS K-6328-1977.

(2) Water-Absorbing Property

A sample having a length of 20 cm and a width of 3 cm was cut out from the fabric having both the surfaces coated, and the upper portion of the sample was secured in the direction of the length and the lower end of the sample along a length of about 0.5 cm was immersed in a 5% dilution of a commercially available red ink charged in an immersion vessel. After 24 hours' immersion at room temperature, the sample was taken out. The ink dilution adhering to the lower end was lightly wiped away by wrapping the lower end with filter paper, and the rising height of the ink dilution was measured (the larger is this height, the larger is the water-absorbing property).

The obtained results are shown in Table 1. Incidentally, the water pressure resistance was more than 2000 mm water column in each sheet.

TABLE 1

| Amount Applied of Water Repellant (% owf) | Treated Fabric of Prsent Invention | | | Conventional Treated Fabric | | |
|---|---|---|---|---|---|---|
| | Sample No. | Peel Strength (Kg/3 cm) | Water-Absorbing Property (cm) (in length direction | Sample No. | Peel Strength (kg/3 cm) | Water-Absorbing Property (cm) in length direction |
| 3 | I | 9.6 | 0 | 1 | 3.8 | 0 |
| 1.5 | II | 9.8 | 0 | 2 | 4.4 | 0 |
| 1.2 | III | 10.0 | 5 | 3 | 6.2 | 5 |
| 1.0 | IV | 10.0 | 10 | 4 | 6.8 | 10 |
| 0.7 | V | 10.2 | 13 | 5 | 6.8 | 13 |
| 0.5 | VI | 10.2 | 17 | 6 | 6.9 | 17 |
| 0.3 | VII | 10.2 | >20 | 7 | 7.2 | >20 |
| 0.1 | VIII | 10.2 | >20 | 8 | 7.1 | >20 |

From the practical viewpoint, the water-absorbing property should be 10 cm or smaller, preferably 5 cm or smaller, especially preferably 0 cm, and the peel strength should be at least 6 Kg/3 cm, preferably 8 to 9 Kg/3 cm or larger. As is apparent from the results shown in Table 1, in case of the conventional method, sample No. 3 had properties close to allowable limits, but according to the conventional method, it is considerably difficult under this condition to carry out the production stable and obtain products having stable properties. In contrast, according to the present invention, a high bonding strength can be obtained without any substantial influence of the concentration of the water repellant, though the bonding strength is greatly influenced by the concentration of the water repellant in the conventional method, and a water-proof sheet having stable product properties can be obtained under stable processing conditions.

EXAMPLE 2

A polyeser spun yarn woven fabric (plain weave of $$\frac{14S/1 \times 14S/1}{53 \text{ yarns/inch} \times 50 \text{ yarns/inch}},$$

basis weight=190 g/m², thickness=0.3 mm) was immersed in a 5% aqueous solution of Phobotex FTC in the same manner as described in Example 1, and the fabric was squeezed at a pick-up of 100 g/m² by a mangle and preliminarily dried at 80° to 90° C. Then, the fabric was baked at 150° C. for 3 minutes to stick the water repellant to the fabric in an amount of 2.5% owf. The as-treated fabric (conventional method) or the treated fabric after the same low temperature plasma treatment as described in Example 1 (present invention) was subjected to the water-proofing treatment under the following conditions.

| | |
|---|---|
| PVC | 100 parts |
| DOP | 60 parts |
| CaCO₃ | 20 parts |
| Cd—Ba type stabilizer | 3 parts |

The fabric was immersed in a solution having the above composition, squeezed by a mangle and heat-treated at 190° C. for 3 minutes to solidify the PVC resin and stick it to the fabric. The amount applied of the water-proof layer was 200 g/m² as solids. In each of the obtained fabric, the water pressure resistance was higher than 2000 mm water column.

When a hood was prepared by using the water-proof sheet and was practically used, intrusion of water into the fibrous substrate fabric was not observed. However, in case of the water-proof sheet according to the conventional method, the coating was peeled by rubbing after about 1 month and the water pressure resistance was reduced, and after 2 months, the sheet could not be put into practical use. In case of the sheet obtained according to the process of the present invention, no change was observed even after it had been used for 2 years.

EXAMPLE 3

A green glass fiber fabric (Turkish satin weave of $$\frac{DE150 \frac{1}{4} 3.3S}{55 \text{ yarns/inch} \times 51 \text{ yarns/inch}},$$

basis weight=290 g/m²) was immersed in a treating solution containing 5% of Scotch Guard FC-232 (fluorine type water repellant supplied by Sumitomo-3M), squeezed at a pick-up of 50% by a mangle, preliminarily dried at 150° C. for 1.5 minutes and baked to obtain a water repellant-treated fabric (conventional method). Then, the treated fabric was subjected to the low temperature plasma treatment in the following manner. More specifically, the fabric was set in a plasma generating apparatus, and argon gas was circulated under reduced pressure so that the pressure was maintained at 0.3 Torr and a high frequency power of 50 W was applied to cause discharge and generate plasma. Thus, both the surfaces of the sheet were treated for 10 minutes.

In the same manner as described in Example 1, a PVC film was heat-bonded to both the surfaces of each fabric to obtain a water-proof sheet. The water pressure resistance of each water-proof sheet was higher than 2000 mm water column, and in each water-proof sheet the water-absorbing property was 0. The peel strength of the sheet obtained according to the process of the present invention was 8.8 Kg/3 cm, while the sheet obtained according to the conventional method was low and 4.2 Kg/3 cm.

EXAMPLES 4 THROUGH 7 AND COMPARATIVE EXAMPLE 1

A glass fiber substrate fabric (Turkish satin weave of $$\frac{DE150 \frac{1}{4} 3.3S}{55 \text{ yarns/inch} \times 51 \text{ yarns/inch}},$$

basis weight=290 g/m²) was scoured, dried and subjected to an impregnation treatment with an aqueous emulsion of a water repellant described below.

Water Repellant A (Example 4)

| | |
|---|---|
| (1) Paraffin wax having melting point of 60° C. | 22 parts |
| (2) Wax-carboxylic acid addition reaction product having acid value of 70 and melting point of 72° C. | 8 parts |
| (3) Aqueous ammonia | 0.3 part |
| (4) Water | 70 parts |
| Wax solid content | 30% |
| pH | 8.3 |
| Viscosity (25° C.) | <100 cp |

The addition reaction product was one obtained by addition reaction of a mixture of a low-molecular-weight polyolefin wax and a petroleum fraction wax with maleic anhydride.

The paraffin wax was melt-mixed with the addition reaction product at 110° C., and aqueous ammonia was added to the molten mixture. Then, the mixture was cooled to 100° C. and boiling water was gradually added. The viscosity was once increased. Stirring was continued while maintaining the temperature at 97° C. to effect phase inversion in the emulsion (to o/w type from w/o type), whereby a stable o/w type emulsion was obtained.

Water Repellant B (Example 5)

A polymer emulsion described below was mixed into the water repellant A at a ratio of 3/1 to obtain a water repellant B.

| (Polymer Emulsion) | |
| --- | --- |
| Butyl Acrylate | 50 parts |
| Ethyl acrylate | 28 parts |
| Methyl methacrylate | 22 parts |
| Sodium salt of unsaturated sulfonic acid | 1 part |
| Ammonium persulfate | 0.8 part |
| Water | 136 parts |
| Solid content | 42.5% |
| Viscosity (25° C.) | 40 cp |
| pH | 3.8 |

(Water and aqueous ammonia were added to the above polymer emulsion so that the pH value was 7.4 and the solid content was 40%).

The polymer emulsion was prepared in the following manner.

A 4-neck flask having a capacity of 500 cc was charged with a predetermined amount of water, and the flask was fixed in a warm water bath and a stirrer, a reflux cooler and a thermometer were attached to the flask. The entire system was made air-tight and nitrogen gas was introduced into the flask until reaction was completed. The nitrogen gas was discharged through a cooling tube. The bath temperature was maintained at about 40° C. Remaining openings of a separating funnel were closed with rubber plugs so that air tightness was kept. Then, 50 parts of butyl acrylate, 28 parts of ethyl acrylate and 22 parts of methyl methacrylate were sufficiently mixed and charged in the separating funnel. Separately, 0.8 part of ammonium persulfate and 1 part of the sodium salt of unsaturated sulfonic acid were uniformly incorporated in water in the flask. The outer temperature was controlled to 60° to 65° C., and the polymer (butyl acrylate and the like) was dropped from the separating funnel, and polymerization was carried out under stirring at 65 rpm. Since the reaction was exothermic, water was added to the outer bath so that the inner temperature dis not exceed 75° C. and the reaction was not inhibited. The polymerization was completed in about 6 hours. Termination of dropping of the monomers was confirmed while conducting stirring at an inner temperature of 80° to 85° C. for 30 minutes, and the confirmation indicated completion of the polymerization. An emulsion containing fine stable particles was obtained. In each case, the yield was 100%.

Water Repellant C (Example 6)

| Paraffin wax having melting point of 60° C. | 30 parts |
| --- | --- |
| Stearyl ether of polyethylene oxide (HLB = 13) | 8.5 parts |
| Potassium hydroxide | 0.04 part |
| Water | 61.5 parts |
| Wax solid content | 30% |
| pH | 7.8 |
| Viscosity (25° C.) | <100 cp |

Water Repellant D (Example 7)

Phobotex FTC (amino resin derivative type water repellant supplied by Ciba-Geigy) was mixed with Catalyzer RB (supplied by Ciba-Geigy) as the catalyst in an amount of 25% by weight based on Phobotex FTC.

The substrate fabric was immersed in any of the above-mentioned treating agent liquid having the above-mentioned concentration, squeezed by a mangle and dried at 120° C. to render the fabric water-repellent. The amount applied as solids of each water repellant was 3% by weight based on the fabric.

In Examples 4 through 7 and Comparative Example 1, the water repellants shown in Tables 2 and 3 were used.

Each of the so-obtained fibrous substrate fabrics was subjected to the low temperature plasma treatment in the following manner. Namely, the substrate fabric was set in a plasma generating apparatus, and while circulating argon gas in the apparatus under reduced pressure to maintain the pressure at 0.3 Torr, a high frequency power of 50 W was applied to cause discharge and generate plasma. Thus, both the surfaces were treated for 10 minutes. Then, both the surfaces of the fabric were coated with a 50% solution of 100 parts of Nipporan 3105 and Coronate L (each being a polyurethane type adhesive supplied by Nippon Polyurethane) in ethyl acetate in an amount of 30 g/m$^2$, followed by drying. Then, a PVC film (0.1 mm thickness) having a composition described below was heat-bonded to both the surfaces.

| PVC | 100 parts |
| --- | --- |
| DOP (plasticizer) | 75 parts |
| Titanium dioxide | 8 parts |
| Antimony trioxide (flame retardant) | 5 parts |
| Zinc stearate (stabilizer) | 3 parts |

With respect to each of the so-obtained water-proof fibrous sheet materials, the peel strength of the coating and the water-absorbing property were measured.

The obtained results are shown in Table 2. In each product, the water pressure resistance was higher than 2000 mm water column.

TABLE 2

| Example No. | Water Repellant Used | Peel Strength (Kg/3 cm) | Water-Absorbing Property (cm) (in warp direction) |
| --- | --- | --- | --- |
| Example 4 | A | 11.2 | 0 |
| Example 5 | B | 10.8 | 0 |
| Example 6 | C | 8.6 | 2 |
| Example 7 | D | 9.4 | 0 |
| Comparative Example 1 | not added | 12.8 | above 20 |

Furthermore, with respect to each of the products, the bending strength was measured according to "Method for Testing Bending Strength of Papers and Sheet Papers by MIT Tester" of JIS P-8115 (1976). The obtained results are shown in Table 3.

TABLE 3

| Example No. | Water Repellant Used | Bending Strength (frequency; times) |
| --- | --- | --- |
| Example 4 | A | 63438 |
| Example 5 | B | 55625 |
| Example 6 | C | 49860 |
| Example 7 | D | 49920 |
| Comparative Example 1 | not added | 2982 |

As is understood from the results shown in Table 3, when a glass fiber substrate fabric is treated according to the present invention, the peel strength is improved and the water-absorbing property is reduced, and furthermore, there is attained an unexpected prominent effect of improving the poor bending strength, which is a fatal defect of a glass fiber substrate fabric. Therefore, the product of the present invention is very valuably used in the field where bending is violent (portable tent and the like) and the field where fluttering or vibration is violent (pitched tent exposed to a wind pressure). According to the present invention, the use of flame retardant, semi-incombustible and incombustible products comprising an inorganic fibrous substrate fabric can be effectively broadened.

EXAMPLES 8 AND 9 AND COMPARATIVE EXAMPLES 2 AND 3

A glass fiber substrate fabric (Turkish satin weave of $$\frac{DE150 \downarrow 3.3S}{55 \text{ yarns/inch} \times 51 \text{ yarns/inch}},$$

basis weight of 290 g/m$^2$) was scoured, dried and immersed in a treating liquid containing 7% of Asahi Guard AG-740 (fluorine type water repellant supplied by Asahi Glass), and fabric was squeezed at a pick-up of 40% by a mangle, preliminarily dried and baked at 180° C. for 1.5 minutes to obtain a water repellant-treated fabric (Comparative Example 2).

In the same manner as described above, the above-mentioned fabric was scoured, dried and immersed in a treating liquid containing 5% of SH-8627 (silicone type water repellant supplied by Toray Silicone), and the fabric was squeezed at a pick-up of 40% by a mangle, preliminarily dried and baked at 350° C. for 5 minutes to obtain a water repellant-treated fabric (Comparative Example 3).

These treated fabrics were subjected to the low temperature plasma treatment in the following manner. Namely, the fabric was set in a plasma generating apparatus, and a high frequency electric power of 100 W was applied while circulating hydrogen gas under reduced pressure so that the pressure was maintained at 0.01 Torr, whereby discharge was caused to generate plasma. Thus, both the surfaces of the fabric were treated for 3 minutes.

Each of these treated fabrics was immersed in a treating liquid containing 2% of KBM (epoxy-silane coupling agent supplied by Shinetsu Silicone), squeezed by a mangle and dried at 120° C. for 3 minutes to obtain a coupling agent-treated fabric (Examples 8 and 9).

Both the surfaces of each of the so obtained treated glass fiber fabrics were coated with a light-grey pasty, addition reaction-curable silicone rubber composition comprising 100 parts dimethylpolysiloxane having both the terminals blocked with vinyl groups and having a viscosity of 10,000 cs, 1.0 part of methylhydrodienepolysiloxane having a viscosity of 40 cs and a platinum compound catalyst as the main components, 0.11 part of benzotriazole as an addition reaction retardant, 1.0 part of carbon black and 0.5 part of aluminum hydroxide powder as a flame retardancy improver according to the knife coater method, and curing was performed by heating at 170° C. for 5 minutes to form a flame-retardant silicone rubber layer having a thickness of 0.1 mm on each of both the surfaces.

With respect to each of these silicone sheet materials, the peel strength of the coating and the water absorbing property were measured.

The obtained results are shown in Table 4. In each product, the water pressure resistance was higher than 2000 mm.

TABLE 4

|  | Used Water Repellant | Plasma Treatment | Coupling Treatment | Peel Strength* (Kg/3 cm) | Water Absorbing Property (cm) (in warp direction) |
|---|---|---|---|---|---|
| Comparative Example 2 | AG-740 | not performed | not performed | 0.9 | 0 |
| Example 8 | AG-740 | performed | performed | breaking of silicone resin | 0 |
| Comparative Example 3 | SH-8627 | not performed | not performed | 1.1 | 0 |
| Example 9 | SH-8627 | performed | performed | breaking of silicone resin | 0 |

Note
*peel strength was measured according to Method 5.3.7 of JIS K-6328-1977 while using a silicone type adhesive as the adhesive With respect to each product, the bending resistance was measured according to "Method of Testing Bending Resistance of Papers and Sheet Papers by MIT Tester" of JIS P-8115 (1976). The obtained results are shown in Table 5.

TABLE 5

| Example No. | Bending Resistance (frequency, times) |
|---|---|
| Comparative Example 2 | 4652 |
| Example 8 | 52391 |
| Comparative Example 3 | 6573 |
| Example 9 | 68894 |

As is seen from the results shown in Table 5, when a glass fiber substrate fabric was treated according to the present invention, the peel strength is improved and the water absorbing property is reduced, and furthermore, there can be attained an unexpected effect of improving the poor bending strength, which is a fatal defect of a glass fiber substrate fabric. Accordingly, the product of the present invention is valuably used in the field where repeated bending is violent (portable tent and the like) and the field where fluttering or vibration is violent (pitched tent and the like). Therefore, the present invention is very valuable for broadening the use of flame-retardant, semi-combustible and incombustible products comprising an inorganic fiber substrate fabric.

EXAMPLE 10

A polyester fiber substrate fabric (plain weave of $$\frac{1000 \ d \times 1000 \ d}{32 \text{ yarns/inch} \times 32 \text{ yarns/inch}},$$

basis weight=300 g/m$^2$, thickness=0.35 mm) was treated with Phobotex FTC (amino resin derivative water repellant supplied by Ciba-Geigy) under conditions described below. As the reaction catalyst, Catalyzer RB (supplied by Ciba-Geigy) was used in an amount of 25% by weight based on Phobotex FTC.

The water repellant was used in the form of an aqueous solution having a concentration of 9.0, 4.5, 3.6, 3.0, 2.1, 1.5, 0.9 or 0.3%, and the concentration of the applied solids was 3.0, 1.5, 1.2, 1.0, 0.7, 0.5, 0.3 or 1.0% owf.

The substrate fabric was immersed in the water repellant solution having the above concentration, squeezed by a mangle so that the wet applied amount was 100 g/m², preliminarily dried at 80° to 90° C. and baked at 150° C. for 3 minutes.

The so-treated fabric was subjected to the corona discharge treatment by using the apparatus shown in FIG. 1.

The fabric was fed between a pair of discharge electrodes at a speed of 10 m/min so that one surface of the fabric was brought into contact with the peripheral surface of the roll-shaped electrode connected to the earth. The back surface of the fabric was continuously subjected to the corona discharge treatment under a voltage of 160 V at an electric current of 18 A and a maximum output of 8 KW (consumed power=7.9 KW/hr) while adjusting the distance A between the electrodes to 10 mm. The diameter of the metal electrode core of each electrode was 20 cm, the thickness of the resin layer was 2 mm (the roll diameter was 20.4 cm), the roll length was 2 m, and the discharge width was 1.92 m. The energy applied to the sample surface was about 440 W/m²/min.

Both the surfaces of the fibrous substrate fabric which had been treated with the water repellant and subjected to the corona discharge treatment were coated with a 50% solution of 100 parts of Nipporan 3105 and 15 parts of Coronate L (each being a polyurethane type adhesive supplied by Nippon Polyurethane Kogyo) in ethyl acetate in an amount coated of 30 g/m², followed by drying. Then, a PVC film (0.1 mm in thickness) having a composition described below was heat-bonded to both the surfaces of the fabric.

| | |
|---|---|
| PVC | 100 parts |
| DOP (plasticizer) | 75 parts |
| Titanium dioxide | 8 parts |
| Antimony trioxide (flame retardant) | 5 parts |
| Zinc stearate (stabilizer) | 3 parts |

With respect to each of the so-obtained sheets, the peel strength of the coating and the water absorbing property were measured.

For comparison, comparative water-proof sheets were prepared in the same manner as described above except that the corona discharge treatment was omitted.

The obtained results are shown in Table 6. Incidentally, in each of the obtained water-proof sheets, the water pressure resistance was higher than 2000 mm.

TABLE 6

| Amount Applied of Water Repellant (% owf) | Treated Fabric of Present Invention | | | Comparative Treated Fabric | | |
|---|---|---|---|---|---|---|
| | Sample No. | Peel Strength (Kg/3 cm) | Water-Absorbing Property (cm) (in warp direction) | Sample No. | Peel Strength (Kg/3 cm) | Water-Absorbing Property (cm) (in warp direction) |
| 3 | I | 9.4 | 0 | 1 | 3.7 | 0 |
| 1.5 | II | 9.6 | 0 | 2 | 4.4 | 0 |
| 1.2 | III | 9.8 | 5 | 3 | 6.2 | 5 |
| 1.0 | IV | 9.8 | 10 | 4 | 6.6 | 10 |
| 0.7 | V | 10.0 | 13 | 5 | 6.6 | 13 |
| 0.5 | VI | 10.0 | 17 | 6 | 6.8 | 17 |
| 0.3 | VII | 10.0 | >20 | 7 | 7.1 | >20 |
| 0.1 | VIII | 10.0 | >20 | 8 | 7.0 | >20 |

From the practical viewpoint, the water absorbing property should be 10 cm or smaller, preferably 5 cm or smaller, especially preferably 0 cm. For this purpose, the water repellant should be applied in an amount of at least 1.0% owf. From the practical viewpoint, the peel strength should be at least 6 Kg/3 cm, preferably 8 to 9 Kg/3 cm or higher. As shown in Table 6, in case of the conventional method (comparative treated fabric), only samples Nos. 3 and 4 are satisfactory from the practical viewpoint but other samples are not satisfactory. Moreover, it is very difficult under conditions of samples Nos. 3 and 4 to conduct the production stably and obtain product having stable properties. On the other hand, according to the process of the present invention, the peel strength is not substantially influenced, by the concentration of the water repellant, and even if the water repellant is applied at such a high concentration as 1.0% owf, a high bonding force can be obtained, and water-proof sheets having stable properties can be obtained under stable processing conditions.

For comparison, water-proof sheets were prepared according to the above-mentioned procedures by carrying out the treatment with the water repellant and the polymer coating treatment after the substrates fabric had been subjected to the corona discharge treatment. In this comparative run, if the amount applied of the water repellant was 1.0% owf or more, the peel strength was drastically reduced and no substantial effect was obtained by the corona discharge treatment.

EXAMPLE 11

A polyester spun yarn woven fabric (plain weave of $$\frac{14 \; S/1 \times 14 \; s/1}{53 \text{ yarns/inch} \times 50 \text{ yarns/inch}},$$

basis weight=190 g/m², thickness=0.3 mm) was immersed in a 5% aqueous solution of Phobotex FTC as in Example 10, squeezed at a pick-up of 100 g/m² by a mangle, preliminarily dried at 80 to 90° C. and baked at 150° C. for 3 minutes to obtain a treated fabric in which the amount applied of the water repellant was 2.5% owf. In the same manner as described in Example 10, the treated fabric was subjected to the corona discharge treatment (process of the present invention) and then subjected to the water-proofing treatment under the following conditions.

| | |
|---|---|
| PVC | 100 parts |
| DOP | 60 parts |

-continued

| | |
|---|---|
| CaCO₃ | 20 parts |
| Vd—Ba type stabilizer | 3 parts |
| Toluene | 100 parts |
| Nipporan 3105 | 10 parts |
| Coronate L | 2 parts |

The treated fabric was immersed in a solution having the above composition, squeezed by a mangle and heat-treated at 190° C. for 3 minutes to gelatinize and solidify the PVC resin. The amount applied of the so-formed water-proof layer was 200 g/m² as the solids. The water pressure resistance of the obtained water-proof sheet was higher than 2000 mm water column.

For comparison, the above procedures were repeated in the same manner except that the corona discharge treatment was omitted, whereby a comparative water-proof sheet (1) was prepared.

When a truck hood was prepared by using the water-proof sheet according to the process of the present invention and was practically used, intrusion of water into the fibrous substrate fabric was not observed at all. However, in case of the comparative water-proof sheet (1), the coating was peeled by rubbing after about 1 month and the water pressure resistance was reduced, and after 2 months, the sheet could not be practically used. In case of the sheet obtained according to the process of the present invention, no change was observed even after it had been used for 2 years.

For further comparison, a comparative water-proof sheet (2) obtained by carrying out the above-mentioned water repellant treatment and polymer coating treatment after the corona discharge treatment was insufficient in the properties as the comparative water-proof sheet 1, and no substantial effect could be attained by the corona discharge treatment.

EXAMPLE 12

A green glass fiber substrate fabric (Turkish satin weave of $$\frac{DE150 \, \tfrac{1}{2} \, 3.3S}{55 \text{ yarns/inch} \times 51 \text{ yarns/inch}},$$

basis weight = 290 g/m²) was immersed in a treating solution containing 5% of Scotch Guard FC-232 (fluorine type water and oil repellant supplied by Sumitomo-3M), squeezed at a pick-up of 50% by a mangle, preliminarily dried and baked at 150° C. for 1.5 minutes (conventional method). Then, the treated fabric was subjected to the corona discharge treatment in the same manner as described in Example 10.

A PVC film was heat-bonded to both the surfaces of each of the fabric treated with the water repellant and the fabric was subjected to the corona discharge treatment, whereby water-proof sheets were obtained. The water pressure resistance of each sheet was higher than 2000 mm water column, and the water absorbing property was 0 in each sheet. The peel strength of the sheet obtained according to the process of the present invention was 8.6 Kg/3 cm, while the water-proof sheet obtained according to the conventional method (the corona discharge treatment was not performed) had a peel strength of 4.0 Kg/3 cm, which was insufficient. In the water-proof sheet obtained by performing the water repellant treatment and polymer coating treatment after the corona discharge treatment, the peel strength was insufficient and 4.0 Kg/3 cm, and no substantial effect could be attained by the corona discharge treatment.

As is apparent from the foregoing experimental results, according to the conventional method, it is very difficult to obtain a water-proof sheet which is well-balanced in the peel strength and the water repellancy (prevention of absorption of water). On the other hand, according to the process of the present invention, a water-proof sheet having high capacities can be easily obtained under stable processing conditions.

EXAMPLE 13 THROUGH 16 AND COMPARATIVE EXAMPLE 4

A glass fiber substrate fabric (Turkish satin weave of $$\frac{DE150 \, \tfrac{1}{2} \, 3.3S}{55 \text{ yarns/inch} \times 51 \text{ yarns/inch}},$$

basis weight = 290 g/m²) was scoured, dried and subjected to the impregnation treatment with an aqueous emulsion described below.

Water Repellant A (Example 13)

| | |
|---|---|
| Paraffin wax having melting point of 60° C. | 22 parts |
| Wax-carboxylic acid addition reaction product having acid value of 70 and melting point of 72° C. | 8 parts |
| Aqueous ammonia | 0.3 part |
| Water | 70 parts |
| Wax solid content | 30% |
| pH | 8.3 |
| Viscosity (25° C.) | <100 cp |

The above-mentioned addition reaction product was one obtained by addition reaction of a mixture of a low-molecular-weight polyolefin wax and a petroleum fraction wax with maleic anhydride.

The above-mentioned paraffin wax and addition reaction product were melt-mixed at 110° C., and aqueous ammonia was added to the molten mixture. The mixture was cooled to 100° C. and boiling water was gradually added to the mixture. The viscosity was once increased, and stirring was continued at a temperature maintained at 97° C. to effect phase inversion in the emulsion (to o/w type from w/o type), whereby a stable o/w emulsion was obtained.

Water Repellant B (Example 14)

A polymer emulsion having a composition described below was added at a ratio of 3/1 to the water repellant B.

| (Polymer Emulsion) | |
|---|---|
| Butyl Acrylate | 50 parts |
| Ethyl acrylate | 28 parts |
| Methyl methacrylate | 22 parts |
| Sodium salt of unsaturated sulfonic acid | 1 part |
| Ammonium persulfate | 0.8 part |
| Water | 136 parts |
| Solid content | 42.5% |
| Viscosity (25° C.) | 40 cp |
| pH | 3.8 |

Water and aqueous ammonia were added to the polymer emulsion so that the pH value was 7.4 and the solid content was 40%.

The polymer emulsion was prepared in the following manner.

A 4-neck flask having a capacity of 500 cc was charged with a predetermined amount of water and was fixed in a warm water bath, and a stirrer, a reflux cooler and a thermometer were attached to the flask. The entire system was kept air-tight, and nitrogen gas was circulated until the reaction was completed. The nitrogen gas was discharged from a cooling tube. The warm water bath temperature was maintained at about 40° C. A separating funnel was attached to the remaining opening of the flask by a rubber plug so that air tightness was maintained. Then, 50 parts of butyl acrylate, 28 parts of ethyl acrylate and 22 parts of methyl methacrylate were sufficiently mixed and charged in the separating funnel. Separately, 0.8 part of ammonium persulfate and 1 part of a sodium salt of unsaturated sulfonic acid were homogeneously mixed into water in the 4-neck flask. The outer temperature was maintained at 60° to 65° C. and the polymer (butyl acrylate and the like) was dropped from the separating funnel, and polymerization was carried out under stirring at 65 rpm. Water was added to the outer bath so that the inner temperature was not elevated above 75° C. by the exothermic reaction. The polymerization was completed in about 6 hours. Termination of dropping of the monomers from the reflux cooler was confirmed while continuing stirring at an inner temperature of 80° to 85° C. for 30 minutes. Termination of dropping indicated completion of the reaction. A stable emulsion of fine particles was obtained. In each case, the yield was substantially 100%.

Water Repellant C (Example 15)

| Paraffin wax having melting point of 60° C. | 30 parts |
|---|---|
| Stearyl ether of polyethylene oxide (HLB = 13) | 8.5 parts |
| Potassium hydroxide | 0.04 part |
| Water | 61.5 parts |
| Wax solid content | 30% |
| pH | 7.8 |
| Viscosity (25° C.) | <100 cp |

Water Repellant D (Example 16)

Phobotex FTC (amino resin derivative water repellant supplied by Ciba-Geigy) was mixed with Catalyzer RB (supplied by Ciba-Geigy) as the reaction catalyst in an amount of 25% by weight based on Phobotex FTC.

The substrate fabric was immersed in any of the above-mentioned water repellant liquid, squeezed by a mangle and dried at 120° C. to render the fabric water-repellent. The amount applied of the water repellant (as the solids) was adjusted to 3% by weight based on the fabric.

In Examples 13 through 16 and Comparative Example 4, the water repellants shown in Tables 7 and 8 were used.

Each of the so-obtained fabrics was subjected to the corona discharge treatment in the same manner as described in Example 10. Both the surfaces of the fabric were coated with 30 g/m² of a 50% solution of 100 parts of Nipporan 3105 and 15 parts of Coronate (each being a polyurethane type adhesive supplied by Nippon Polyurethane Kogyo) in ethyl acetate, followed by drying. Then, a PVC film (0.1 mm in thickness) having a composition described below was heat-bonded to both the surfaces of the fabric.

| PVC | 100 parts |
|---|---|
| DOP (plasticizer) | 75 parts |
| Titanium dioxide | 8 parts |
| Antimony trioxide (flame retardant) | 5 parts |
| Zinc stearate (stabilizer) | 3 parts |

With respect to each of the so-obtained water-proof fibrous sheet materials, the peel strength of the coating and the water absorbing property were measured.

The obtained results are shown in Table 7. Incidentally, in each sheet, the water pressure resistance was higher than 2000 water column.

TABLE 7

| Example No. | Used Water Repellant | Peel Strength (Kg/3 cm) | Water Absorbing Property (cm) (in warp direction) |
|---|---|---|---|
| Example 13 | A | 10.4 | 0 |
| Example 14 | B | 9.8 | 0 |
| Example 15 | C | 8.2 | 2 |
| Example 16 | D | 8.6 | 0 |
| Comparative Example 4 | not added | 12.8 | above 20 |

With respect to each of the products, the bending resistance was measured by "Method for Testing Bending Resistance of Papers and Sheet Papers by MIT Tester" of JIS P-8115 (1976). The obtained results are shown in Table 8.

TABLE 8

| Example No. | Used Water Repellant | Bending Resistance (frequency, times) |
|---|---|---|
| Example 13 | A | 69820 |
| Example 14 | B | 57240 |
| Example 15 | C | 52326 |
| Example 16 | D | 50628 |
| Comparative Example 4 | not added | 2982 |

As is apparent from the experimental results shown in Table 8, when a glass fiber substrate fabric is treated according to the present invention, the peel strength is improved and the water absorbing property is reduced, and there can be attained an unexpected prominent effect of improving the poor bending resistance, which is a fatal defect of a glass fiber substrate fabric. Accordingly, the product of the present invention is valuably used in the field where repeated bending is violent (portable tent and the like) and the field where fluttering or vibration is violent (pitched tent exposed to a wind pressure and the like). The present invention is effective for broadening the use of flame-retardant, semi-incombustible and incombustible materials comprising an inorganic fibrous substrate fabric.

EXAMPLES 17 AND 18 AND COMPARATIVE EXAMPLES 5 AND 6

A glass fiber substrate fabric (Turkish satin weave of

DE150 ⅓ 3.3S
---
55 yarns/inch × 51 yarns/inch basis weight=290 g/m$^2$) was immersed in a treating liquid containing 7% of Asahi Guard AG-740 (fluorine type water and oil repellant supplied by Asahi Glass), squeezed at a pick-up of 40% by a mangle, preliminarily treated and baked at 180° C. for 1.5 minutes to obtain a fabric treated with the water repellant (Comparative Example 5).

In the same manner as described above, the above-mentioned substrate fabric was scoured, dried, immersed in a treating liquid containing 5% of SH-8627 (silicone type water repellant supplied by Toray Silicone), squeezed at a pick-up of 40% by a mangle, preliminarily dried and baked at 350° C. for 5 minutes to obtain a fabric treated with the water repellant (Comparative Example 6).

These treated fabrics were subjected to the corona discharge treatment in the same manner as described in Example 10.

The resulting treated fabrics were immersed in a treating liquid containing 2% of KBM 303 (epoxy-silane type coupling agent supplied by Shinetsu Silicone), squeezed by a mangle and dried at 120° C. for 3 minutes (Examples 17 and 18).

Both the surfaces of each of the so-obtained treated glass fiber fabrics were coated with a light-grey pasty, addition reaction-curable silicone rubber composition comprising 100 parts of dimethylpolysoloxane having both the terminals blocked with vinyl groups and having a viscosity of 10,000 cs and a platinum compound catalyst as the main components, 0.11 part of benzotriazole as an addition reaction retardant, 1.0 part of carbon black and 50 parts of aluminum hydroxide powder as a flame retardancy improver by the knife coater method, and heat curing was carried out at 170° C. for 5 minutes to form a flame-retardant silicone rubber layer having a thickness of 0.1 mm on both the surfaces.

With respect to each of the so-obtained silicone sheet materials, the peel strength of the coating and the water absorbing property were measured.

The obtained results are shown in Table 9. In each sheet, the water pressure resistance was higher than 2000 mm water column.

Testing Bending Resistance of Papers and Sheet Papers by MIT Type Tester" of JIS P-8115 (1976). The obtained results are shown in Table 10.

TABLE 10

| Example No. | Bending Resistance (frequency, times) |
|---|---|
| Comparative Example 5 | 4650 |
| Example 17 | 51268 |
| Comparative Example 6 | 6582 |
| Example 18 | 67286 |

As is seen from the experimental results shown in Table 10, when a glass fiber substrate fabric is treated according to the present invention, the peel strength is improved and the water absorbing property is reduced, and furthermore, there can be attained an unexpected prominent effect of improving the poor bending resistance, which is a fatal defect of a glass fiber substrate fabric. The product of the present invention is valuably used in the field where repeated bending is violent (portable tent and the like) and the field where fluttering or vibration is violent (pitched tent exposed to a wind pressure and the like). The present invention is effective for broadening the use of flame-retardant, semi-incombustible and incombustible materials comprising an inorganic fiber substrate fabric.

What is claimed is:

1. A process for the preparation of a water-proof fabric sheet having polymer coatings on both surfaces of a fibrous textile fabric substrate, which has been formed into said substrate through the use of weaving, non-woven and knitting fabric forming techniques, comprising the steps of:
    (a) treating the fibrous fabric substrate with a water repellant treatment;
    (b) subjecting both surfaces of the treated fabric to corona discharge treatment; and
    (c) forming a polymer coating on both surfaces of the fabric.

2. A process for the preparation of water-proof sheets, which comprises forming a polymer coating on both the surfaces of a fibrous substrate fabric, wherein the fibrous substrate is first treated with a water repellant, both the surfaces of the fabric are then subjected to corona discharge treatment, and a polymer coating is then formed on both the surfaces of the fabric.

TABLE 9

| | Used Water Repellant | Plasma Treatment | Coupling Treatment | Peel Strength* (Kg/3 cm) | Water Absorbing Property (cm) (in warp direction) |
|---|---|---|---|---|---|
| Comparative Example 5 | AG-470 | not performed | not performed | 0.9 | 0 |
| Example 17 | AG-740 | performed | performed | breaking of silicon resin | 0 |
| Comparative Example 6 | SH-8627 | not-performed | not performed | 1.1 | 0 |
| Example 18 | SH-8627 | performed | performed | breaking of silicon resin | 0 |

Note
*peel strength was measured according to method 5.3.7 of JIS K-6328-1977 by using a silicone type adhesive as the adhesive With respect to each of the products, the bending resistance was measured according to "Method for

* * * * *

UNITED STATES PATENT AND TRADEMARK OFFICE
CERTIFICATE OF CORRECTION

PATENT NO. : 4,696,830

DATED : September 29, 1987

INVENTOR(S) : Tsutomu Obayashi et al

It is certified that error appears in the above-identified patent and that said Letters Patent is hereby corrected as shown below:

Column 1, line 32, change "hardly" to --hard to--.

Column 1, line 34, change "to degrade" to --which degrades--.

Column 2, line 57, delete "motor".

Column 3, line 48, change "o" to --to--.

Column 3, line 55, change "dyn/cm" to --dyne/cm--.

Column 3, line 60, change "while" to --by--.

Column 3, line 67, change "through" to --though--.

Column 4, line 6, change "intended treatment degree" to --intended degree of treatment--.

Column 4, line 17, delete "of the surface" after "layer".

Column 5, line 42, delete "was used".

Column 7, the Table of Example 2, after
    "Cd-Ba type stabilizer        3 parts"
insert in Table form

| | |
|---|---|
| --Toluene | 100 parts |
| Nipporan 3105 | 10 parts |
| Coronate L | 2 parts-- . |

Column 7, line 50, change "fabric" to --fabrics--.

Column 8, line 4, change "the low" to --a low--.

Column 9, line 66, change "liquid" to --liquids--.

UNITED STATES PATENT AND TRADEMARK OFFICE
CERTIFICATE OF CORRECTION

PATENT NO. : 4,696,830

DATED : September 29, 1987

INVENTOR(S) : Tsutomu Obayashi et al

It is certified that error appears in the above-identified patent and that said Letters Patent is hereby corrected as shown below:

Column 10, line 19, before "thickness" insert --in--.

Column 11, line 62, change "pasty" to --paste--.

Column 14, line 32, after "influenced" delete --,--.

Column 15, line 35, change "the comparative" to --compared to the comparatively--.

Column 16, line 1, change "insufficient and 4.0 Kg/3cm" to --4.0 Kg/3cm which was insufficient--.

Column 17, in the table of Example 15, change "Stearyl ether of polyethylene oxide (HLB=13)" to --Polyethylene oxide stearyl ether (HLB=13)--.

Column 19, line 29, change "pasty" to --paste--.

Column 19, line 33, change "cs" to --cps--.

Signed and Sealed this

Third Day of May, 1988

Attest:

DONALD J. QUIGG

Attesting Officer

Commissioner of Patents and Trademarks